(12) United States Patent
Wierzynski

(10) Patent No.: US 12,066,327 B2
(45) Date of Patent: Aug. 20, 2024

(54) METHODS AND APPARATUSES FOR CALIBRATING A SENSOR

(71) Applicant: ROCKLEY PHOTONICS LIMITED, Altrincham (GB)

(72) Inventor: Casimir Wierzynski, La Jolla, CA (US)

(73) Assignee: Rockley Photonics Limited, Altrincham (GB)

( * ) Notice: Subject to any disclaimer, the term of this patent is extended or adjusted under 35 U.S.C. 154(b) by 0 days.

(21) Appl. No.: 17/886,409

(22) Filed: Aug. 11, 2022

(65) Prior Publication Data

US 2023/0112044 A1    Apr. 13, 2023

Related U.S. Application Data

(60) Provisional application No. 63/253,054, filed on Oct. 6, 2021.

(51) Int. Cl.
*G01J 3/02* (2006.01)
*G01J 3/42* (2006.01)

(52) U.S. Cl.
CPC .............. *G01J 3/0297* (2013.01); *G01J 3/42* (2013.01)

(58) Field of Classification Search
CPC .............. G01J 3/0297; G01J 3/42; G01J 3/28
See application file for complete search history.

(56) References Cited

U.S. PATENT DOCUMENTS

| 7,839,502 B2 * | 11/2010 | Lukas ...................... G01J 3/28 356/326 |
| 2003/0078746 A1 | 4/2003 | Samsoondar |
| 2008/0297796 A1 | 12/2008 | Lukas et al. |
| 2016/0334274 A1 * | 11/2016 | Xu ............................. G01J 3/28 |
| 2019/0041269 A1 * | 2/2019 | Hwang .................. G01N 21/31 |
| 2021/0381891 A1 * | 12/2021 | Holt .......................... G01J 3/18 |

(Continued)

FOREIGN PATENT DOCUMENTS

| EP | 0 692 703 A1 | 1/1996 |
| WO | WO 2013/163268 A1 | 10/2013 |

(Continued)

OTHER PUBLICATIONS

International Search Report and Written Opinion of the International Searching Authority, mailed Jan. 30, 2023, corresponding to PCT/EP2022/077718; 17 pages.

(Continued)

*Primary Examiner* — Tarifur R Chowdhury
*Assistant Examiner* — Kemaya Nguyen
(74) *Attorney, Agent, or Firm* — Lewis Roca Rothgerber Christie LLP

(57) ABSTRACT

A method for determining a calibration function includes: calculating a first distance, between a distribution of target spectra and a comparison distribution of spectra; calibrating the distribution of target spectra with a first preliminary calibration function to form a first distribution of calibrated target spectra; calculating a second distance, between the first distribution of calibrated target spectra and the comparison distribution of spectra; determining that the second distance is less than the first distance; and setting the calibration function equal to the first preliminary calibration function.

18 Claims, 3 Drawing Sheets

(56) References Cited

U.S. PATENT DOCUMENTS

2022/0074863 A1* 3/2022 Da Costa Martins ...................... G06F 18/231
2023/0085600 A1* 3/2023 Koshel .................. G01J 3/0297
356/319

FOREIGN PATENT DOCUMENTS

WO    WO 2017/076228 A1    5/2017
WO    WO-2021254825 A1 * 12/2021

OTHER PUBLICATIONS

Zhang, L. et al., "Wavelength Calibration Based on Back Propagation Neural Network" 2014 International Conference on Anti-Counterfeiting, Security and Identification (ASID), Dec. 12, 2014, pp. 1-4, IEEE.

* cited by examiner

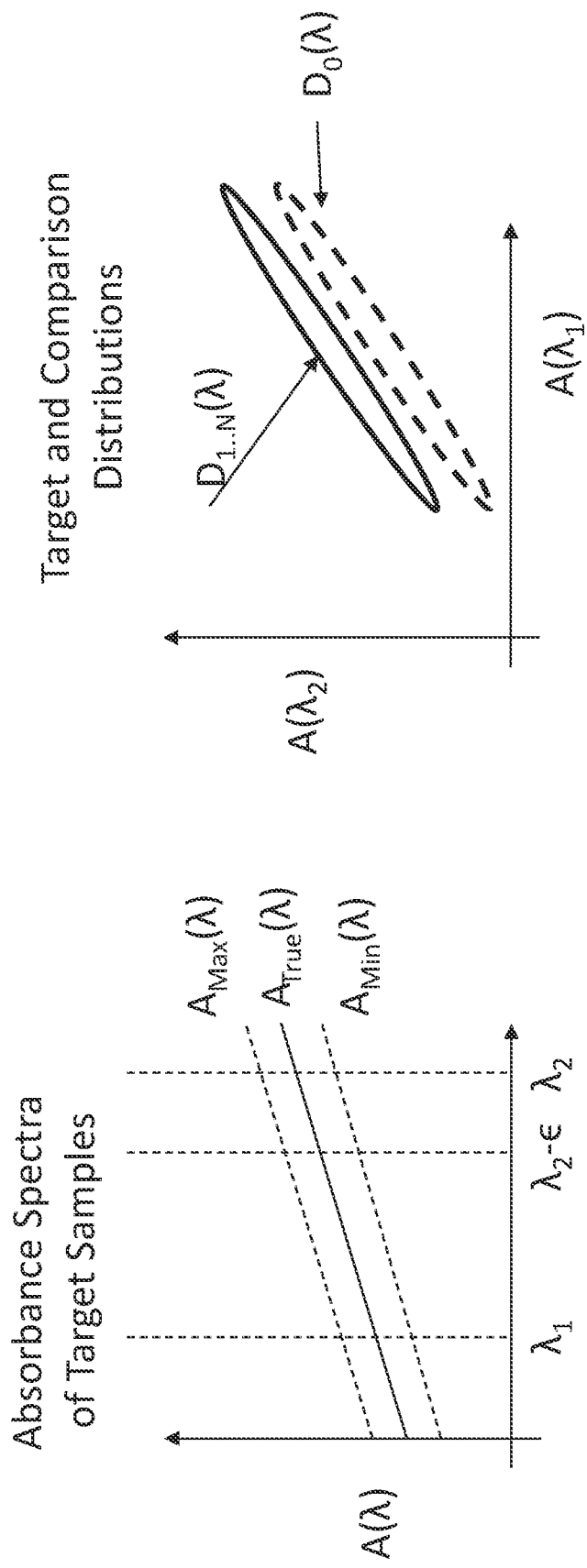

METHODS AND APPARATUSES FOR CALIBRATING A SENSOR

CROSS REFERENCE TO RELATED APPLICATION

This application claims priority to and the benefit of U.S. Provisional Application No. 63/253,054, filed on Oct. 6, 2021, the entire content of which is hereby incorporated by reference.

BACKGROUND

1. Field

The present disclosure generally relates to methods and apparatuses for calibrating sensors.

2. Description of the Related Art

Spectrometer sensors configured to measure absorbances as a function of wavelength may be miscalibrated in the sense that an expected wavelength that it is measuring an absorbance for may be different from the actual wavelength that it is the measuring absorbance for. This mis-calibration may arise due to, for example, a manufacturing defect in the spectrometer sensor or deterioration or other changes within the spectrometer sensor during its lifetime. There is therefore a continual need to improve methods and apparatuses for calibrating spectrometer sensors.

SUMMARY

According to some embodiments of the present disclosure, a method for determining a calibration function includes: calculating a first distance, between a distribution of target spectra and a comparison distribution of spectra; calibrating the distribution of target spectra with a first preliminary calibration function to form a first distribution of calibrated target spectra; calculating a second distance, between the first distribution of calibrated target spectra and the comparison distribution of spectra; determining that the second distance is less than the first distance; and setting the calibration function equal to the first preliminary calibration function.

In an example, the distribution of target spectra includes one or more spectra measured by a target sensor, and the comparison distribution of spectra includes one or more comparison distributions corresponding to one or more respective comparison sensors, each of the comparison distributions including one or more spectra measured by the corresponding comparison sensor.

In an example, the target sensor is an optical spectrophotometer and each of the comparison sensors is an optical spectrophotometer.

In an example, the comparison distribution of spectra is based on the one or more comparison distributions.

In an example, the comparison distribution of spectra is the union of the one or more comparison distributions.

In an example, the target spectra are spectra of at least one target sample, each of the at least one target sample being from a same class of samples, and the spectra of the comparison distribution of spectra are spectra of at least one comparison sample, each of the at least one comparison samples being from the same class of samples as the at least one target sample is from.

In an example, the method further includes: illuminating each of the at least one target samples with light of a respective plurality of actual wavelengths of radiation; and measuring, by a target sensor and for each of the at least one target samples, respective portions of the light of the respective plurality of actual wavelengths transmitted through the target sample, wherein the target spectra includes a plurality of absorbance values of the target sample respectively based on the portions of light.

In an example, the first distance is calculated based on a metric, and the metric is a Wasserstein distance metric, a Kullback-Leibler divergence metric, a Renyi divergence metric, or an f-divergence metric.

In an example, the method further includes selecting the first preliminary calibration function from among a family of preliminary calibration functions.

In an example, the first preliminary calibration function maps a set of nominal wavelengths to a set of calibrated wavelengths.

In an example, the method further includes defining the first preliminary calibration function by training a neural network to provide a calibrated wavelength of the set of calibrated wavelengths in response to being provided with a nominal wavelength of the set of nominal wavelengths.

According to some embodiments of the present disclosure, a processing circuit for determining a calibration function is configured to: calculate a first distance, between a distribution of target spectra and a comparison distribution of spectra; calibrate the distribution of target spectra with a first preliminary calibration function to form a first distribution of calibrated target spectra; calculate a second distance, between the first distribution of calibrated target spectra and the comparison distribution of spectra; determine that the second distance is less than the first distance; and set the calibration function equal to the first preliminary calibration function.

In an example, the distribution of target spectra includes one or more spectra measured by a target sensor, and the comparison distribution of spectra includes one or more comparison distributions corresponding to one or more respective comparison sensors, each of the comparison distributions including one or more spectra measured by the corresponding comparison sensor.

In an example, the target sensor is an optical spectrophotometer and each of the comparison sensors is an optical spectrophotometer.

In an example, the comparison distribution of spectra is based on the one or more comparison distributions.

In an example, the processing circuit is in the target sensor.

In an example, the processing circuit is further configured: to receive the distribution of target spectra; and to receive, from a cloud storage or a memory external to the target sensor, the one or more comparison distributions.

In an example, the target spectra are spectra of at least one target sample, each of the at least one target sample being from a same class of samples, and the spectra of the comparison distribution of spectra are spectra of at least one comparison sample, each of the at least one comparison samples being from the same class of samples as the at least one target sample are from.

In an example, the first distance is calculated based on a metric, and the metric is a Wasserstein distance metric, a Kullback-Leibler divergence metric, a Renyi divergence metric, or an f-divergence metric.

In an example, the first preliminary calibration function maps a set of nominal wavelengths to a set of calibrated wavelengths.

BRIEF DESCRIPTION OF THE DRAWINGS

The accompanying drawings, together with the specification, illustrate example embodiments of the present disclosure.

FIG. 2A depicts a range of true absorbance spectra of target samples according to some embodiments.

FIG. 2B depicts a target distribution and a secondary comparison distribution according to some embodiments.

DETAILED DESCRIPTION

Figure 1:
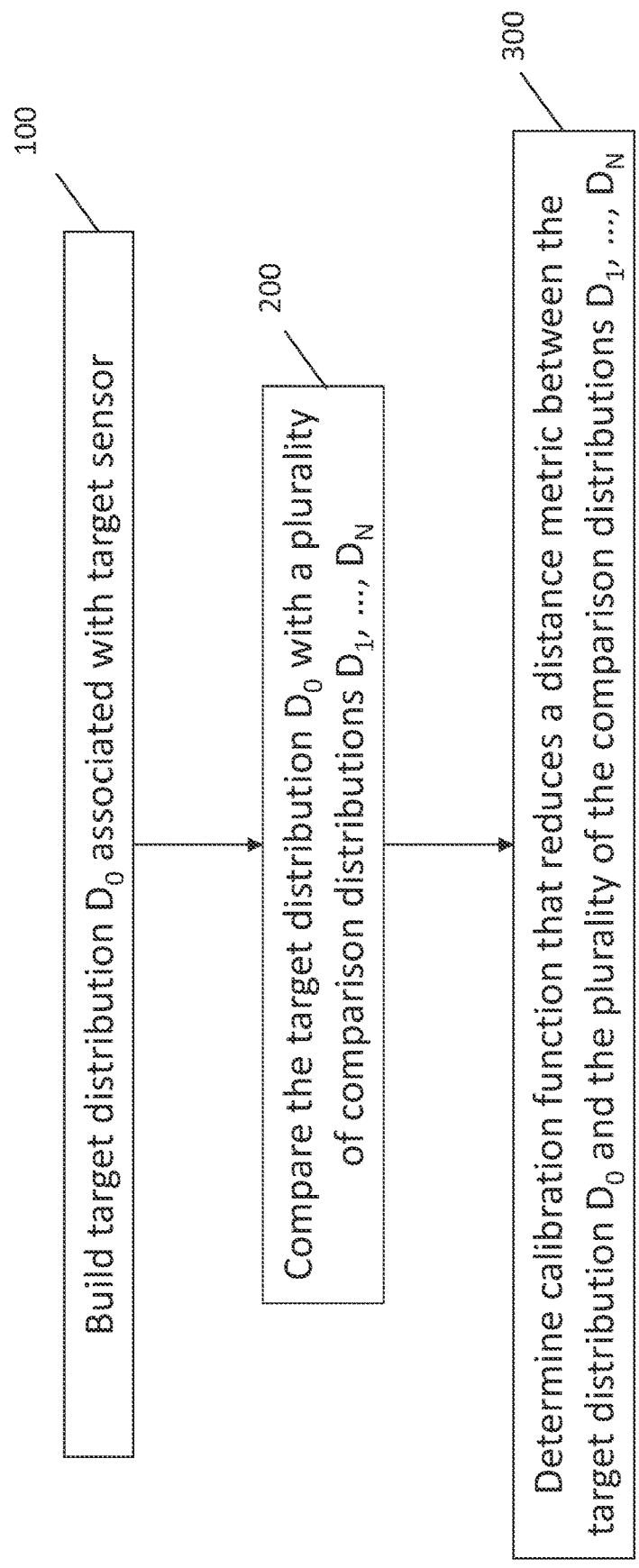
FIG. 1 depicts a method for calibrating a target sensor according to some embodiments.

The detailed description set forth below in connection with the appended drawings is intended as a description of exemplary embodiments of methods and apparatuses of calibrating an instrument, such as a spectrometer, for example, from unlabelled data, provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the present disclosure. As denoted elsewhere herein, like element numbers are intended to indicate like elements or features.

The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB. A processing circuit may be distributed, e.g., a processing circuit may consist of, or include, a plurality of processing circuits in communication with each other (via wires, fibers, or wireless communication links).

As used herein, the word "or" is inclusive, so that, for example, "A or B" means any one of (i) A, (ii) B, and (iii) A and B.

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

A spectrometer (e.g., a spectrophotometer) may illuminate a sample with light, and measure light returning to the spectrometer, after propagating through the sample, as a function of wavelength. The ratio of (i) the radiant flux received by the spectrometer to (ii) the radiant flux transmitted by the spectrometer may be referred to, for the sake of brevity, as the "absorbance" even though attenuation mechanisms other than absorption may affect this ratio. This may be accomplished by emitting light at a set of wavelengths and measuring how much power is reflected or transmitted at each wavelength. The sample has a true spectrum of $A_{True}(\lambda)$. The spectrometer approximates this spectrum by measuring a finite set of spectral values $\{A(\lambda_k)\}$ for k=1 to K.

A common problem is that, because of fabrication variations or deterioration or changes over time, the laser wavelengths are miscalibrated—i.e., the actual wavelengths emitted and measured will not, in general, match the desired or expected wavelengths. This means that the measured spectrum may be misinterpreted—the absorbance measurements may be associated with the wrong wavelengths.

One way to correct this problem is to measure the actual wavelengths emitted. However, this may involve either adding significant complexity to the sensor itself or providing an external measurement device.

But by analyzing the measurements of a single sensor on one or more samples from a class of samples and comparing it to the measurements of many identically designed "comparison" sensors on the same class of samples, it can be estimated what wavelength adjustments to the single sensor would bring its distribution of measured spectra closer in line to those measured by the population of other comparison sensors. These adjustments may be used to calibrate the single sensor. Moreover, these calibrations may be applied not just once but repeatedly as the sensor ages.

FIG. 1 depicts a method of calibrating a target sensor according to some embodiments. Referring to FIG. 1, in some embodiments, the method includes a first process 100 of building a target distribution $D_0$ associated with a target sensor, a second process 200 of comparing the target distribution $D_0$ with a plurality of comparison distributions $\{D_1 \ldots D_N\}$, wherein N is an integer equal to or greater than 2, and a third process 300 of determining a calibration function that reduces a distance, as measured by a metric, between the target distribution $D_0$ and a plurality of comparison distributions $\{D_1 \ldots D_N\}$. The "target distribution" may be referred to herein as a "distribution of target spectra."

The first process 100 may include illuminating each of a plurality of target samples with light at a respective plurality of actual wavelengths and measuring, by the target sensor and for each target sample, a plurality of absorbances, of the target sample, respectively associated with the actual wavelengths. If it is uncalibrated, the target sensor may report the plurality of absorbances together with a plurality of respective nominal wavelengths, which are the respective wavelengths that the plurality of actual wavelengths are assumed or expected to be. However, at least some of the actual wavelengths may be different from their respective nominal wavelengths, e.g., due to mis-calibration or fabrication imperfection of the target sensor. For example, one of the target samples may be illuminated by what is believed to be a nominal wavelength, but the target sample may actually be illuminated by an actual wavelength that slightly or significantly differs from the nominal wavelength, e.g., due to a mis-calibration or fabrication imperfection of the target senor.

The target samples may all be from the same class of samples. For example, the class of samples may be a type of biological tissue (e.g., muscle, fat, bone, brain tissue, heart tissue, etc.) or a type of biological material (e.g., blood, plasma, bone marrow, etc.). The class of samples may be biological tissue or biological material at a certain region of a person, animal, plant, fungus, etc., such as the abdomen, neck, eye, or wrist of a person. In some embodiments, the class of samples may be a type of non-biological material.

The target sensor may be utilized to illuminate the target samples. For example, the target sensor may contain one or more lasers. In some embodiments, the target sensor may contain one laser configured to generate light of various wavelengths. In some other embodiments, the target sensor contains a plurality of lasers, each of the plurality of lasers being configured to generate light of a respective wavelength. In some other embodiments, one or more lasers or light sources utilized to illuminate the target samples may be separate from the target sensor, and the calibration methods and apparatuses described herein may be utilized to calibrate the one or more lasers or light source(s). When the target sensor or laser light source(s) is calibrated, each measured absorbance value of a sample may be reported with a respective calibrated wavelength that may be closer, to the respective actual wavelength with which the sample was illuminated, than the respective nominal wavelength by which the sample was assumed or expected to be illuminated. For example, each spectrometer measurement may be reported as a pair of vectors, including a vector of wavelengths, and a vector of corresponding absorbances.

The pluralities of nominal wavelengths by which the plurality of target samples are respectively assumed to be illuminated may be the same or different. For example, a first target sample may be illuminated by a first plurality of nominal wavelengths, a second target sample may be illuminated by a second plurality of nominal wavelengths, and the first and second pluralities of nominal wavelengths may be the same or different.

The number of target samples may be any suitable number greater than or equal to two, for example five or more, ten or more, fifty or more, or one hundred or more. The number of nominal wavelengths by which each sample is illuminated may be any suitable number greater than or equal to two, for example, five or more, ten or more, or twenty or more.

The target distribution $D_0$ may include a plurality of absorbance spectra respectively associated with the plurality of target samples. Each of the absorbance spectra of the target distribution $D_0$ may include the plurality of absorbance values of the associated target sample as measured by the target sensor and respectively associated with the plurality of nominal wavelengths.

The second process 200 may include accessing data of a plurality of comparison distributions $D_1 \ldots D_N$. This data may be stored in the cloud or in a memory external to the target sensor, and this data may be accessed, for example, by a processing circuit. The processing circuit may be in the target sensor or in a computer or device external to the target sensor, and the processing circuit may be configured to perform the second process.

Each of the comparison distributions $D_1 \ldots D_N$ may be associated with a comparison sensor and may include a plurality of absorbance spectra. For each comparison distribution, each absorbance spectrum of the comparison distribution may include a plurality of absorbance values of a respective sample within the same class of samples as the target samples, measured by the comparison sensor associated with the comparison distribution, and respectively associated with a plurality of reported wavelengths.

The plurality of comparison sensors may be sensors that were fabricated similarly or identically to the target sensor. Therefore, even if some of the comparison sensors are miscalibrated, it may be assumed that most of the comparison sensors are accurately or nearly accurately calibrated, or at least that the calibration error varies randomly, from comparison sensor to comparison sensor, and that the mean calibration error, at each wavelength, over all of the comparison sensors, is close to zero. Moreover, the absorbance data of the samples of the comparison distributions may represent the true absorbance spectra of the target samples when considered collectively, because the samples of the comparison distributions are in the same class of samples as the target samples. Accordingly, the difference between the target distribution $D_0$ and the collective comparison distributions $D_1 \ldots D_N$ characterizes the extent by which the target sensor is miscalibrated.

The second process 200 may therefore include comparing the target distribution $D_0$ and the comparison distributions $D_1 \ldots D_N$ to determine how different the target distribution $D_0$ is from the comparison distributions $D_1 \ldots D_N$. In some embodiments, a metric M is utilized to define or measure a distance the target distribution $D_0$ and the comparison distributions $D_1 \ldots D_N$ (i.e., $M(D_0 \| \{D_1 \ldots D_N\})$, where $\{D_1 \ldots D_N\}$ is the set of comparison distributions $D_1 \ldots D_N$ and may be used herein interchangeably with $D_1 \ldots D_N$). For example, the metric may be used to define or measure a distance between the target distribution $D_0$ and a secondary comparison distribution $D_{1 \ldots N}$ (i.e., $M(D_0 \| D_{1 \ldots N})$) that is a distribution based on the comparison distributions $D_1 \ldots D_N$. As used herein, a "secondary comparison distribution" is a distribution that is calculated or defined based on a plurality of distributions and may be referred to herein as a "comparison distribution of spectra." The secondary comparison distribution $D_{1 \ldots N}$ may be a distribution that is calculated or defined based on the comparison distributions $D_1 \ldots D_N$. In some embodiments, the secondary comparison distribution $D_{1 \ldots N}$ is defined as the union of the comparison distributions $D_1 \ldots D_N$, e.g., it is a distribution including the data points from each of the comparison distributions $D_1 \ldots D_N$.

In some embodiments, the metric M is the Wasserstein distance between the target distribution $D_0(\lambda)$ and the secondary distribution $D_{1 \ldots N}(\lambda)$. The Wasserstein distance may be calculated, for example, using the Python function scipy.stats.wasserstein_distance. In some other embodiments, the metric M is the Kullback-Leibler divergence, the Renyi divergence, or the f-divergence. Some metrics, such as the Wasserstein distance, may use, for discrete distributions such as $D_0$ and $D_{1 \ldots N}$, a measure of distance between points in the distributions (where each point may be a pair of vectors resulting from the measurement of a spectrum, as described above). The distance between two such pairs of vectors may be defined as a measure of the distance between two continuous curves each based on a respective one of the two pairs of vectors. Each continuous curve may be formed from the corresponding pair of vectors by, for example, forming a set of ordered pairs, each ordered pair including an element of the wavelength vector and the corresponding element of the absorbance vector, and fitting a curve (of absorbance as a function of wavelength) to the ordered pairs (for example, using linear interpolation or extrapolation, or, as another example, using a spline such as a cubic spline). The distance between the two continuous curves may then be calculated, for example, as the mean squared error between the curves, or as the root mean squared error between the curves, or as the integral of the absolute value of the difference between the curves. In some embodiments, the metric M may be defined to be the distance between a first average spectrum (represented by a pair of vectors) and a second average spectrum (represented by a pair of vectors), the distances between pairs of vectors being defined as described above. The first average spectrum may be an average of all of the spectra in the target distribution, and the second average spectrum may be an average of all of the spectra in the comparison distributions.

In the third process 300, a calibration function $C^*(\lambda)$ may be determined that maps wavelengths to calibrated wavelengths. The calibration function $C^*(\lambda)$ may be determined such that, when the nominal wavelengths of the target distribution $D_0$ are calibrated by the calibration function $C^*(\lambda)$, the distance between the target distribution $D_0$ and the comparison distributions $D_1 \ldots D_N$, as measured by the metric M, is reduced or minimized. Because the distance is reduced when the nominal wavelengths of the target distribution $D_0$ are mapped to the calibrated wavelengths, it may be assumed that the calibration of the target sensor is improved when nominal wavelengths of the target sensor are mapped to calibrated wavelengths using the calibration function $C^*(\lambda)$. The third process 300 may be performed by the processing circuit.

The calibration function $C^*(\lambda)$ may be determined by selecting a function from a family of preliminary calibration functions $C(\lambda)$, for example, by using an algorithm. The family of functions may be, for example, a family of polynomials. For example, several preliminary calibration functions from the family of preliminary calibration functions $C(\lambda)$ may be analyzed to determine how they affect the distance, as measured by the metric M, between the target distribution $D_0$ and the comparison distributions $D_1 \ldots D_N$ when the nominal wavelengths of the target distribution $D_0$ are calibrated by the preliminary calibration functions, and the calibration function $C^*(\lambda)$ may be defined to be one of the analyzed preliminary calibration functions, such as the preliminary calibration function that reduces the distance, as measured by the metric M, by the greatest amount from among the analyzed preliminary calibration functions.

In some embodiments, the calibration function $C^*(\lambda)$ may be determined by solving the optimization problem $C^*(\lambda) = \mathrm{argmin}_c M(D_0(C^*(\lambda)) \| \{D_1 \ldots D_N\})$. The family of preliminary calibration functions $C(\lambda)$ may be defined as a function parametrized by several parameters, and selecting the calibration function $C^*(\lambda)$ may include using gradient descent or another numerical minimum-finding algorithm. Such an algorithm may iteratively test different preliminary calibration functions and arrive at a calibration function, $C'(\lambda)$ that approximates $C^*(\lambda)$. The iteration may terminate when (i) $M(D_0(C'(\lambda)) \| \{D_1 \ldots D_N\})$ falls below the threshold, (ii) the ratio of $M(D_0(C'(\lambda)) \| \{D_1 \ldots D_N\})$ to $M(D_0(\lambda) \| \{D_1 \ldots D_N\})$ falls below a threshold (e.g., 0.2, 0.1, or 0.01), (iii) a set number of iterations has been performed, or (iv) a set computational cost has been expended (which may be measured, for example, as time elapsed).

In some other embodiments, a trainable neural network may be used as a functional form for the family of preliminary calibration functions $C(\lambda)$, where the neural network includes one input (a wavelength), one output (a calibrated wavelength), and multiple hidden layers with more than one neuron. The neural network may then be fed information, such as information including or based on the comparison distributions $D_1 \ldots D_N$, and trained to output wavelengths such that, when the nominal wavelengths of the target distribution $D_0$ are calibrated by the neural network, the distance between the target distribution $D_0$ and the comparison distributions $D_1 \ldots D_N$, as measured by the metric M, is reduced.

Once the calibration function $C^*(\lambda)$ is determined, the target sensor may report, with each spectrum measured, calibrated wavelengths, e.g., the set $\{C^*(\lambda_i)\}$, where $\lambda_i$ is the set of nominal wavelengths at which the spectrum was presumed to have been measured.

Figure 3B:
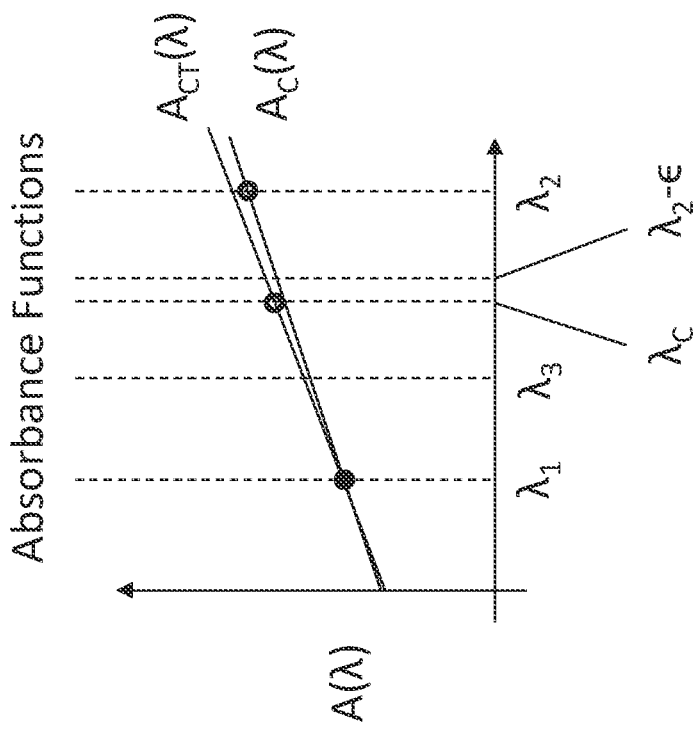
FIG. 3B depicts a calibrated absorbance function and a comparison absorbance function according to some embodiments.
Figure 3A:
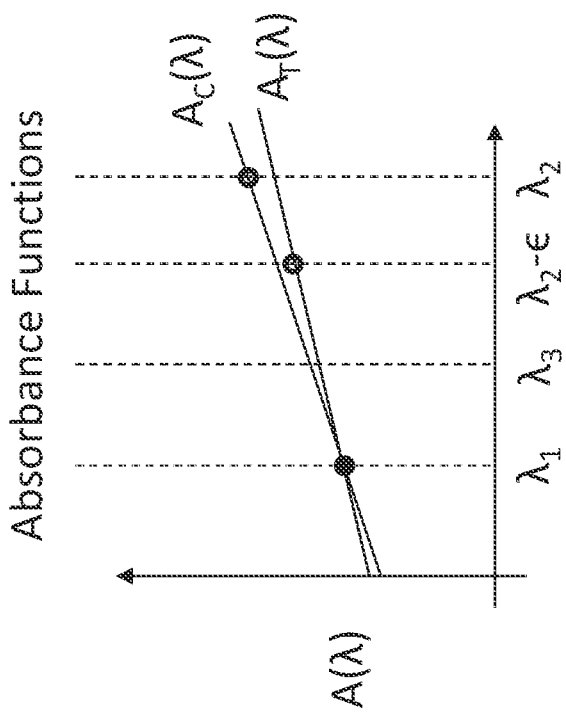
FIG. 3A depicts a target absorbance function and a comparison absorbance function according to some embodiments.

An example embodiment of a method and apparatus for calibrating a target sensor will now be described in more detail with reference to FIGS. 2A-3B. FIG. 2A depicts a range of true absorbance spectra of a plurality of target samples according to some embodiments. FIG. 2B depicts a target distribution and a secondary comparison distribution according to some embodiments. FIG. 3A depicts a target absorbance function and a comparison absorbance function according to some embodiments. FIG. 3B depicts a calibrated target absorbance function and the comparison absorbance function according to some embodiments.

The plurality of target samples may have true absorbance spectra that are closely grouped together because the target samples are within the same class of samples. For example, FIG. 2A shows a first true absorbance spectrum $A_{True}(\lambda)$ of a first target sample, and the remaining true absorbance spectra associated with the remaining target samples may be grouped around the first true absorbance spectrum $A_{True}(\lambda)$ and generally within a range demarcated by a maximum absorbance boundary $A_{Max}(\lambda)$ and a minimum absorbance boundary $A_{Min}(\lambda)$.

Each of the target samples is illuminated with a first nominal wavelength $\lambda_1$ and a second nominal wavelength $\lambda_2$, and first and second absorbance values respectively associated with the first and second nominal wavelengths $\lambda_1$ and $\lambda_2$ are measured for each of the target samples by the target sensor. FIGS. 3A and 3B illustrate these concepts for a simple case in which the target distribution consists of a single spectrum $A_T(\lambda)$ as measured by the target sensor, and the secondary comparison distribution consists of a single spectrum $A_C(\lambda)$ as measured by one of the comparison sensors, and the target sensor and the comparison sensor both measure at the same wavelength for the first nominal wavelength $\lambda_1$. However, in the example of FIGS. 3A and 3B, at the second nominal wavelength $\lambda_2$ the target sensor is miscalibrated relative to the comparison sensor; the target sensor measures at $\lambda_2-\epsilon$, whereas the comparison sensor measures at $\lambda_2$. As may be seen in FIG. 3A, this results in a difference between two continuous functions (straight lines) fit to the respective discrete spectra. After calibration, the target sensor may report, for the second wavelength (instead of $\lambda_2$), $\lambda_C$ (which is closer to $\lambda_2-\epsilon$, than is $\lambda_2$), and, as a result, the two continuous functions fit to the respective discrete spectra differ less than in the uncalibrated case.

Referring to FIG. 2B, the target distribution $D_0$ may be represented in a 2-dimensional space having as the first dimension a first absorbance $A(\lambda_1)$ associated with the first nominal wavelength $\lambda_1$ and as the second dimension a second absorbance $A(\lambda_2)$ associated with the second nominal wavelength $\lambda_2$. The target distribution $D_0$ may have a plurality of absorbance spectra respectively associated with the plurality of target samples, and each absorbance spectrum of the target distribution $D_0$ may be a point in the 2-dimensional space having a first coordinate value equal to the first absorbance value of the corresponding target sample and a second coordinate value equal to the second absorbance value of the corresponding target sample. In some other embodiments, the target samples may each be illuminated with light at K different wavelengths, where K is a positive integer greater than 2, the target distribution may be represented in a K-dimensional space, and each of the absorbance spectrum of the target distribution may be a point in the K-dimensional space.

Referring again to FIG. 2B, a plurality of comparison distributions $D_1 \ldots D_N$ may be represented in the 2-dimensional space together with the target distribution $D_0$. FIG. 2B depicts a secondary comparison distribution $D_{1\ldots N}$ in the 2-dimensional space that is based on the comparison distributions $D_1 \ldots D_N$. For example, the secondary comparison distribution $D_{1\ldots N}$ may be the union of the comparison distributions $D_1 \ldots D_N$.

Each of the comparison distributions $D_1 \ldots D_N$ is associated with a comparison sensor and includes one or more absorbance spectra. For each comparison distribution, each of the absorbance spectra of the comparison distribution includes a pair of first and second absorbance values of a sample within the same class as the target samples, measured by the comparison sensor, and respectively associated with first and second nominal wavelengths $\lambda_1$ and $\lambda_2$.

Because the first nominal wavelength $\lambda_1$ of the target sensor is accurately calibrated, the target distribution $D_0$ may be generally aligned with the secondary comparison distribution $D_{1\ldots N}$ along the first dimension $A(\lambda_1)$. However, because the second nominal wavelength $\lambda_2$ of the target sensor is miscalibrated and associated with an actual second wavelength $\lambda_2-\epsilon$, the target distributions $D_0$ may be generally misaligned from the secondary comparison distribution $D_{1\ldots N}$ along the second dimension $A(\lambda_2)$.

A metric M may be used to measure or define a distance between the target distribution $D_0$ and the secondary comparison distribution $D_{1\ldots N}$. A preliminary calibration function $C_P(\lambda)$ may then be selected, for example, from a family of functions $C(\lambda)$ and by an algorithm, to analyze how the distance, as measured by the metric M, between the target distribution $D_0$ and the secondary comparison distribution $D_{1\ldots N}$, changes when the nominal wavelengths of the target distribution $D_0$ are calibrated by the preliminary calibration function $C_P(\lambda)$. For example, the preliminary calibration function $C_P(\lambda)$ may map the first nominal wavelength $\lambda_1$ to itself (i.e., to $\lambda_1$) and map the second nominal wavelength $\lambda_2$ to a calibrated wavelength $\lambda_C$.

The target distribution $D_0$ may then be calibrated by the preliminary calibration function $C_P(\lambda)$ to define a calibrated target distribution $D_C$. The calibrated target distribution $D_C$ may include a plurality of calibrated absorbance spectra respectively associated with the plurality of target samples. Each calibrated absorbance spectrum may include the first and second absorbance values of the associated target sample, as measured by the target sensor, but the first and second calibrated absorbance values may be respectively associated with the first and calibrated wavelengths $\lambda_1$ and $A_C$.

A target sensor may be calibrated multiple times over a period time as the target sensor ages and experiences internal changes that may cause the target sensor to become miscalibrated again after an earlier calibration.

Although example embodiments of methods and apparatuses for calibrating a target sensor have been described herein, the present disclosure is not limited thereto. Any instrument configured to measure a quantity that varies as a function of an independent variable may be calibrated, for errors in the setting of the independent variable, utilizing methods and apparatuses within the scope of the present disclosure. For example, a mass spectrometer, a radio frequency spectrum analyzer, an instrument for measuring one or more properties of samples as a function of temperature, may be calibrated using analogous methods.

Although exemplary embodiments of calibrating instruments, for example, by self-calibration based on unlabeled data, have been described and illustrated herein, many modifications and variations will be apparent to those skilled in the art. Accordingly, it is to be understood that methods and apparatuses for calibrating an instrument constructed according to principles of the present disclosure may be embodied other than as specifically described herein. The invention is also defined in the following claims, and equivalents thereof.

What is claimed is:

1. A method for determining a calibration function, the method comprising:
    calculating a first distance, between a distribution of target spectra and a comparison distribution of spectra;
    calibrating the distribution of target spectra with a first preliminary calibration function to form a first distribution of calibrated target spectra;
    calculating a second distance, between the first distribution of calibrated target spectra and the comparison distribution of spectra;
    determining, after calculating the second distance, that the second distance is less than the first distance; and
    setting, after determining that the second distance is less than the first distance, the calibration function equal to the first preliminary calibration function,
    wherein the distribution of target spectra comprises one or more spectra measured by a target sensor, and the comparison distribution of spectra comprises a plurality of comparison distributions corresponding to a plurality of respective comparison sensors, each of the comparison distributions comprising one or more spectra measured by the corresponding comparison sensor, and
    wherein the target sensor comprises a light source.

2. The method of claim 1, wherein the target sensor is an optical spectrophotometer comprising the light source, and each of the comparison sensors is an optical spectrophotometer.

3. A method for determining a calibration function, the method comprising:
    calculating a first distance, between a distribution of target spectra and a comparison distribution of spectra;
    calibrating the distribution of target spectra with a first preliminary calibration function to form a first distribution of calibrated target spectra;
    calculating a second distance, between the first distribution of calibrated target spectra and the comparison distribution of spectra;
    determining, after calculating the second distance, that the second distance is less than the first distance; and
    setting, after determining that the second distance is less than the first distance, the calibration function equal to the first preliminary calibration function,
    wherein the distribution of target spectra comprises one or more spectra measured by a target sensor, and the comparison distribution of spectra comprises a plurality of comparison distributions corresponding to a plurality of respective comparison sensors, each of the comparison distributions comprising one or more spectra measured by the corresponding comparison sensor, and wherein the comparison distribution of spectra is based on the plurality of comparison distributions.

4. The method of claim 3, wherein the comparison distribution of spectra is the union of the plurality of comparison distributions.

5. The method of claim 1, wherein the target spectra comprise spectra of one or more target samples, each of the one or more target samples being from a same class of samples, and wherein the spectra of the comparison distribution of spectra are spectra of one or more comparison samples, each of the one or more comparison samples being from the same class of samples as the one or more target samples are from.

6. The method of claim 5, further comprising:
illuminating each of the one or more target samples with light of a respective plurality of actual wavelengths; and
measuring, by the target sensor and for each of the one or more target samples, respective portions of the light of the respective plurality of actual wavelengths transmitted through the target sample, wherein the target spectra comprise, for each of the one or more target samples, a plurality of absorbance values of the target sample that are respectively based on the measured portions of light.

7. The method of claim 1, wherein the first distance is calculated based on a metric, and the metric is a Wasserstein distance metric, a Kullback-Leibler divergence metric, a Renyi divergence metric, or an f-divergence metric.

8. The method of claim 1, further comprising selecting the first preliminary calibration function from among a family of preliminary calibration functions.

9. The method of claim 1, wherein the first preliminary calibration function maps a set of nominal wavelengths to a set of calibrated wavelengths.

10. The method of claim 9, further comprising defining the first preliminary calibration function by training a neural network to provide a calibrated wavelength of the set of calibrated wavelengths in response to being provided with a nominal wavelength of the set of nominal wavelengths.

11. A processing circuit for determining a calibration function, the processing circuit being configured to:
calculate a first distance, between a distribution of target spectra and a comparison distribution of spectra;
calibrate the distribution of target spectra with a first preliminary calibration function to form a first distribution of calibrated target spectra;
calculate a second distance, between the first distribution of calibrated target spectra and the comparison distribution of spectra;
determine, after calculating the second distance, that the second distance is less than the first distance; and set, after determining that the second distance is less than the first distance, the calibration function equal to the first preliminary calibration function, wherein the distribution of target spectra comprises one or more spectra measured by a target sensor, and the comparison distribution of spectra comprises a plurality of comparison distributions corresponding to a plurality of respective comparison sensors, each of the comparison distributions comprising one or more spectra measured by the corresponding comparison sensor, and wherein the target sensor comprises a light source.

12. The processing circuit of claim 11, wherein the target sensor is an optical spectrophotometer comprising the light source, and each of the comparison sensors is an optical spectrophotometer.

13. The processing circuit of claim 11, wherein the comparison distribution of spectra is based on the plurality of comparison distributions.

14. The processing circuit of claim 11, wherein the processing circuit is in the target sensor.

15. The processing circuit of claim 14, wherein the processing circuit is further configured:
to receive the distribution of target spectra; and
to receive, from a cloud storage or a memory external to the target sensor, the one or more comparison distributions.

16. The processing circuit of claim 11, wherein the target spectra comprise spectra of one or more target samples, each of the one or more target samples being from a same class of samples, and wherein the spectra of the comparison distribution of spectra are spectra of one or more comparison samples, each of the one or more comparison samples being from the same class of samples as the one or more target sample are from.

17. The processing circuit of claim 11, wherein the first distance is calculated based on a metric, and the metric is a Wasserstein distance metric, a Kullback-Leibler divergence metric, a Renyi divergence metric, or an f-divergence metric.

18. The processing circuit of claim 11, wherein the first preliminary calibration function maps a set of nominal wavelengths to a set of calibrated wavelengths.

* * * * *